United States Patent [19]

Tsukimoto et al.

[11] Patent Number: 5,726,515
[45] Date of Patent: Mar. 10, 1998

[54] VIBRATION DRIVEN MOTOR

[75] Inventors: Takayuki Tsukimoto, Kawasaki; Takashi Maeno, Yokohama, both of Japan

[73] Assignee: Canon Kabushiki Kaisha, Tokyo, Japan

[21] Appl. No.: 403,574

[22] Filed: Mar. 14, 1995

Related U.S. Application Data

[63] Continuation of Ser. No. 079,849, Jun. 22, 1993, abandoned, which is a continuation of Ser. No. 738,423, Jul. 31, 1991, abandoned.

[30] Foreign Application Priority Data

| Aug. 3, 1990 | [JP] | Japan | 2-206231 |
| Aug. 3, 1990 | [JP] | Japan | 2-206234 |
| May 1, 1991 | [JP] | Japan | 3-100124 |

[51] Int. Cl.$^6$ ........................ H02N 2/00
[52] U.S. Cl. ........................ 310/323
[58] Field of Search ................ 310/323, 325

[56] References Cited

U.S. PATENT DOCUMENTS

| 3,331,589 | 7/1967 | Hammitt et al. | 310/325 |
| 3,524,085 | 8/1970 | Shoh | 310/325 |
| 3,578,996 | 5/1971 | Balmuth | 310/323 |
| 4,065,687 | 12/1977 | Mishiro | 310/325 |
| 4,703,214 | 10/1987 | Mishiro | 310/323 |
| 4,705,980 | 11/1987 | Mishiro | 310/325 |
| 4,728,843 | 3/1988 | Mishiro | 310/325 |
| 4,764,702 | 8/1988 | Mishiro | 310/323 |
| 4,885,499 | 12/1989 | Ueha et al. | 310/325 |
| 4,975,614 | 12/1990 | Honda | 310/323 |
| 5,001,382 | 3/1991 | Umeda et al. | 310/323 |
| 5,057,182 | 10/1991 | Wuchinich | 310/323 |
| 5,112,300 | 5/1992 | Ureche | 310/323 |
| 5,122,700 | 6/1992 | Tamai et al. | 310/323 |
| 5,231,325 | 7/1993 | Tamai et al. | 310/323 |
| 5,270,484 | 12/1993 | Tsuchiya et al. | 310/323 |

FOREIGN PATENT DOCUMENTS

| 62-92779 | 4/1987 | Japan | H02N 2/00 |
| 63-15677 | 1/1988 | Japan | H02N 2/00 |
| 0240380 | 10/1988 | Japan | 310/323 |
| 0159985 | 6/1990 | Japan | 310/325 |
| 0011981 | 1/1991 | Japan | 310/323 |

OTHER PUBLICATIONS

Rev. Telegr. Electron. (Argentina), vol. 67, No. 792, Jan, 1979, by G. Venturino et al.

*Primary Examiner*—Thomas M. Dougherty
*Attorney, Agent, or Firm*—Fitzpatrick, Cella, Harper & Scinto

[57] ABSTRACT

In an ultrasonic motor wherein a driving signal is applied to an electro-mechanical energy conversion element provided in a vibration member to thereby excite flexural vibrations of the same shape in the two different planes of the vibration member with a phase difference in time and thereby create rotational motion on the surface of the vibration member, thus frictionally driving a movable member which is in pressure contact with the vibration forming surface, electro-mechanical energy conversion elements for exciting the flexural vibrations are each disposed at a position whereat the sum totals of strains created in the electro-mechanical energy conversion elements are substantially equal to each other.

21 Claims, 17 Drawing Sheets

FIG. 18A  FIG. 18B  FIG. 18C
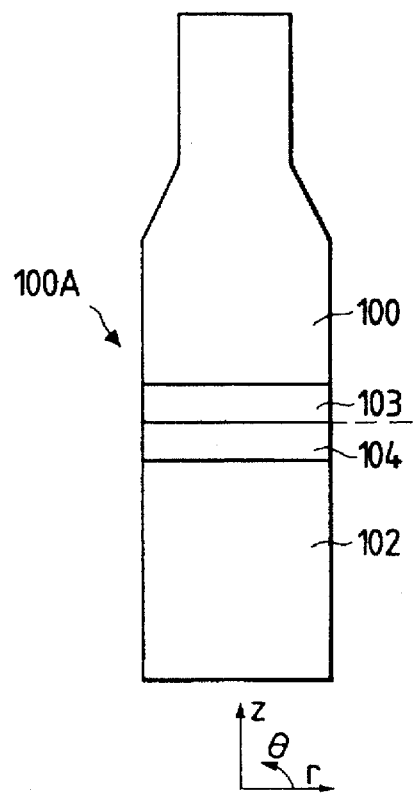 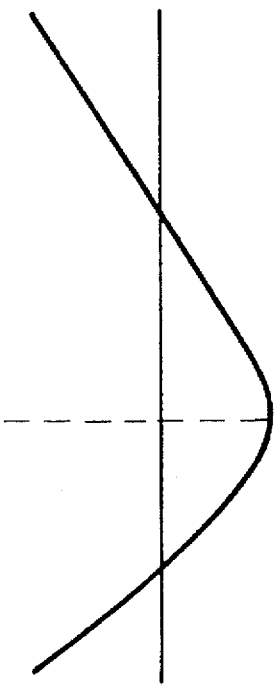 
FIG. 18D  FIG. 18E  FIG. 18F
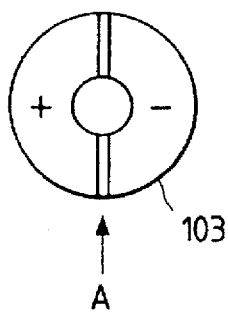 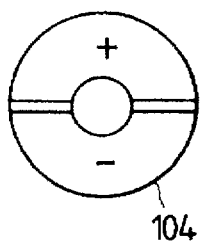 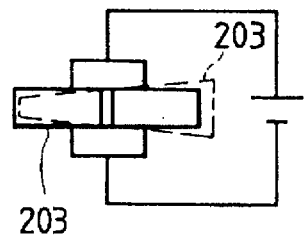

FIG. 22A   FIG. 22B   FIG. 22C
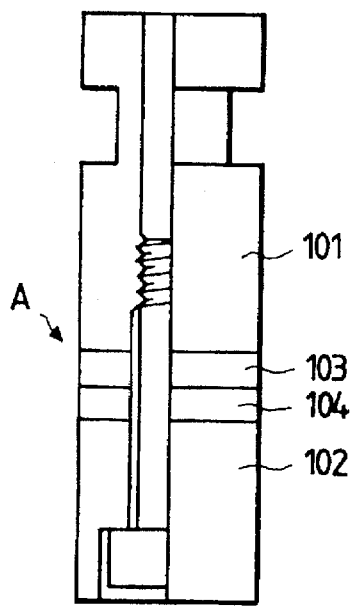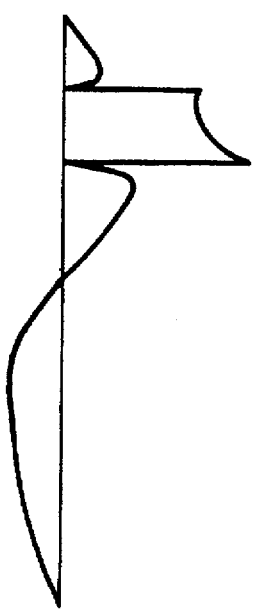
FIG. 23
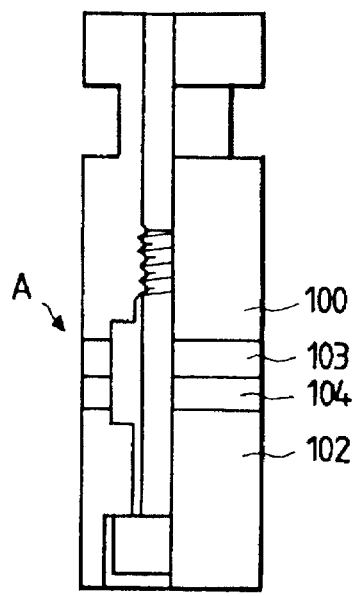

FIG. 25A  FIG. 25B  FIG. 25C
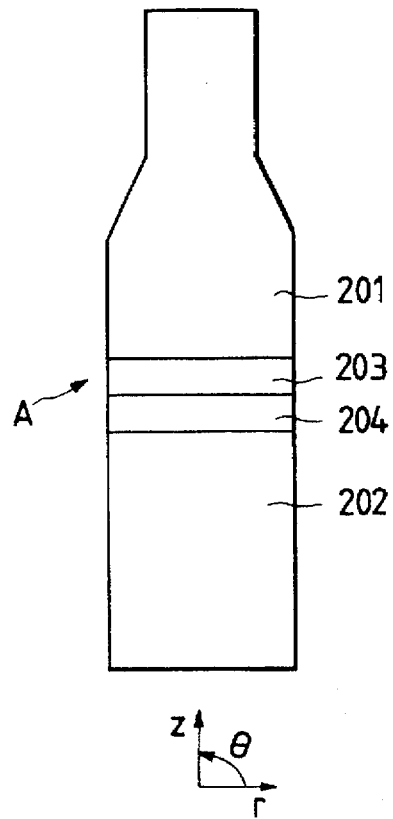
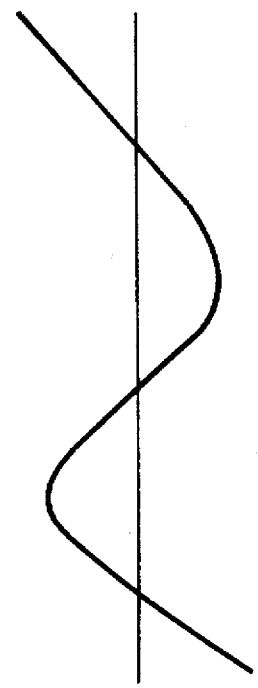
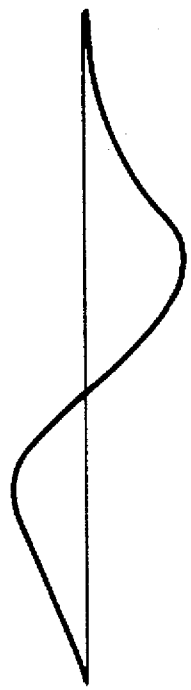
FIG. 25D  FIG. 25E  FIG. 25F
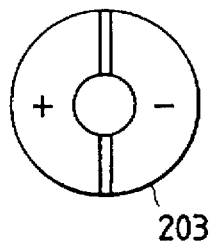
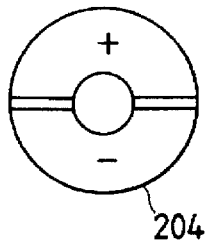
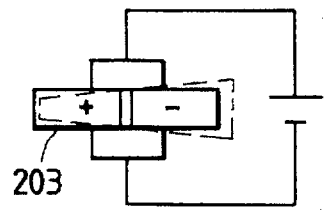

VIBRATION DRIVEN MOTOR

This application is a continuation of application Ser. No. 08/079,849 filed Jun. 22, 1993, now abandoned which is a continuation of application Ser. No. 07/738,423 filed Jul. 31, 1991, now abandoned.

BACKGROUND OF THE INVENTION

1. Field of the Invention

This invention relates to an ultrasonic motor in which electrical energy is supplied to an electro-mechanical energy conversion element provided on a bar-like resilient member to thereby vibrate the resilient member as a bar-like vibration member and cause circular or elliptical motion at the surface particle of the vibration member, thus frictionally driving a movable member pressed against the vibration member, and particularly to an ultrasonic motor suitable for use in optical instruments such as cameras and business machines such as printers.

2. Related Background Art

Ultrasonic motors of the type in which flexural vibration is caused in a circular ring-like resilient member, and a lens driving movable member is driven by a frictional force, have heretofore been put into practical use in AF mechanisms of cameras. However, the ultrasonic motor of this conventional type is of a ring-like shape and therefore is relatively high in cost as a unit including a pressing mechanism and disadvantageous in cost as a motor which is required to be hollow. So, a motor of the type as shown in FIGS. 2 to 4 of the accompanying drawings which is solid and easy to construct a pressing system has been proposed in recent years.

This proposed motor will hereinafter be described briefly with reference to FIGS. 2 to 4.

FIG. 2 is a perspective view of the vibration member of a bar-like ultrasonic motor, and FIG. 3 is a vertical cross-sectional view showing the construction of the motor.

A vibration member creates primary flexural vibration as shown in FIG. 4 by electro-mechanical energy conversion elements (hereinafter referred to as PZTs) $a_1$ and $a_2$. PZT $a_1$ and PZT $a_2$ have a phase difference of 90° in position therebetween, and PZT $a_1$ and PZT $a_2$ each are comprised of two piezo-electric element plates (polarization-processed into different polarities with the diametrical portion thereof as a boundary). The letter C designates a bolt having a thin pillar-like shape in the upper portion C-1 thereof. PZT $a_1$ and PZT $a_2$ are sandwiched and fixed between a fore metal block $b_1$ and a rear metal block $b_2$ which are vibration members constituting members made of a metal relatively small in attenuation such as brass or stainless steel.

The shape of pillar portion C-1 is determined such that the dimensions of the displacement during the vibration of the vibration member become small near the upper part of the pillar portion which is coupled to a vibration member fixing member g. A movable member d is given the spring force of a coil spring k in a spring case f through a bearing e and is in pressure contact with the upper surface of the vibration member.

Now, the primary flexural mode created by PZTs $a_1$ and $a_2$ is excited in two kinds in a direction having a positional phase difference of 90° relative to a direction θ (an angle in a plane orthogonal to the axis) and with a deviation of 90° in terms of time and therefore, the point A of the portion of contact with the movable member (shown in FIG. 4) effects elliptical motion. The direction of this motion is determined by the shape of the vibration member, and the point A effects elliptical motion in a plane inclined by an angle α with respect to the Z-axis. At this time, the movable member which is in pressure contact is frictionally driven.

In such an ultrasonic motor, AC voltages of the kinds corresponding to the number of flexural vibrations excited become necessary.

Also, these AC voltages should desirably be of the same voltage amplitude from the convenience of a driving circuit, and this also holds true of the circular ring type ultrasonic motor of the prior art. In the bar-like ultrasonic motor, however, it has been found that when two sets of flexural vibrations by the A phase and B phase piezo-electric elements $a_1$ and $a_2$ are driven by the same voltage, the amplitudes of the vibrations differ from each other and elliptical motions differing in shape are created on the circumference of the vibration member. This state is shown in FIG. 5 of the accompanying drawings. Two sets of flexural vibrations are excited by PZTs $a_1$ and $a_2$ in FIG. 3. If at this time, the amplitudes of the vibrations differ from each other, uniform circular motion will not take place on the circumference, as shown in FIG. 5. Here, each ellipse is a displacement locus, and becomes such as shown when the amplitude excited by PZT $a_1$ is smaller than the amplitude excited by PZT $a_2$. At this time, the circumferential speed at a point B is greater than the value at a point C, and the movable member is driven at a different feed speed while the vibration of the vibration member makes one round.

On the other hand, the movable member tends to rotate at a certain constant speed due to its inertial mass Therefore, it does not follow this speed difference but slips, and this provides a sliding loss which reduces the efficiency of the motor.

Generally, the equivalent circuit of one phase (e.g. A phase) of the driving circuit of the ultrasonic motor is shown as in FIG. 6 of the accompanying drawings when for example, the vibration speed of the portion of contact with the movable member is standard. In FIG. 6, Cd is the electrostatic capacity of PZT used, A is the force coefficient, $C_m$ is the equivalent attenuation constant (including the load output), k is the equivalent spring constant, and m is the equivalent mass.

That is, in order that speeds $Ve^{iwt}$ created in two phases (two flexural modes) when a voltage $Ve^{icost}$ is applied to the input terminal of the piezo-electric element of one phase of the driving circuit for the vibration member may be equal to each other, these constants can become equal to each other.

Cd is determined by the dielectric constant, shape, etc. of the PZTs. Accordingly, to make Cd equal, the materials and shapes of the PZTs can be made coincident with each other. This condition is generally satisfied and in the prior art as well, as shown in FIG. 4, two PZTs having a thickness of 0.5 mm are used for PZT $a_1$ and two PZTs of the same thickness and shape are used for PZT $a_2$, and this condition is satisfied and irregularity is small.

Also, $C_m$, k, m, etc. are coincident between PZT $a_1$ and PZT $a_2$ because flexural vibrations of the same shape are utilized in the vibration member having an axis-symmetrical shape.

Accordingly, the reason why the speeds, i.e., displacements, between the two phases are made incoincident (because frequencies are equal) is that the force coefficient A differs. Also, the force coefficient A is given by the ratio between the vibration speed and the electric current. Therefore, the reason is considered to be that this coefficient differs.

On the other hand, the electric current is determined by the materials, shapes and strains of the PZTs. However since the materials, shapes, etc. of the PZTs are made the same in order to make the electrostatic capacities Cd of the PZTs equal, the difference between the electric currents flowing through the two PZTs is considered to be due to the difference in strain. That is, it is considered to be because the strains created in PZT $a_1$ and PZT $a_2$ when equal vibration displacements are obtained in directions $\theta a_1$ and $\theta a_2$ shown in FIG. 5 differ from each other.

Now, a bar-like ultrasonic motor of the type wherein both end surfaces (surface $t_1$ and surface $t_2$) are driving, as shown in FIG. 12 of the accompanying drawings, is generally made in a symmetrical shape with the central surface in the lengthwise direction (the axial direction) in order to equalize the vibration speeds on both end surfaces.

However, in a bar-like ultrasonic motor of the type which is driven only on one end surface (e.g. surface $t_1$), it is desirable to make only the amplitude on the driving surface side great.

The reason for this is that by making the vibration amplitudes on the portions other than the driving portion small, the strain created in the vibration member is made small, and it is possible to make the energy loss in the vibration member small. Paying attention to such a fact, the applicant has proposed an invention in which a constriction is provided near the driving surface, whereby the vibration member has an asymmetrical shape in the axial direction. A vibration member embodying this invention is shown in FIG. 13 of the accompanying drawings.

With regard to this vibration member, the admittance when the A phase piezo-electric element $a_1$ is driven and the admittance when the B phase piezo-electric element $a_2$ is driven superposed one upon the other are shown in FIG. 8 of the accompanying drawings. As will be seen from this figure, in the case of this vibration member, the admittance Y at a resonance point F is considerably greater when the A phase piezo-electric element $a_1$ is driven.

Now, when the angular frequency is $\omega$, the admittance Y can be expressed as follows by the use of the aforementioned symbols:

$$Y = \frac{1}{j\left(\omega \frac{m}{A^2} - \frac{A^2 k}{\omega}\right) + \frac{C_m}{A^2}} \quad (1)$$

During the resonation of the vibration member, the imaginary number portion in the parentheses is zero and therefore, $Y = A_2/C_m$. That is, Y is proportional to the square of the force coefficient.

Accordingly, in the vibration member shown in FIG. 13, it is foreseen that the strains when driving flexural vibrations are created in the A phase piezo-electric element $a_1$ and the B phase piezo-electric element $a_2$ differ greatly from each other. The result of the actual calculation of the strains created in the vibration member effected by the use of FEM is shown in FIG. 14 of the accompanying drawings.

From this result, it is seen that the strain created in the B phase piezo-electric element $a_1$ is considerably smaller than the strain created in the A phase piezo-electric element $a_1$.

That is, in FIG. 14, the strain in the A phase piezo-electric element $a_1$ is greater than the strain in the B phase piezo-electric element $a_2$ and therefore, even if voltages of the same level are applied to the A and B phases, a greater electric current will flow through the A phase piezo-electric element $a_1$ with a result that a difference will occur between the amplitudes of flexural vibrations.

SUMMARY OF THE INVENTION

It is an object of the present invention to solve the above-noted problem and to provide an ultrasonic motor (hereinafter also referred to as a vibration driven motor or actuator) in which driving signals of voltages of the same magnitude are supplied to piezo-electric elements of two phases, whereby flexural vibrations of the same amplitude can be formed.

Other objects of the present invention will become apparent from the following detailed description of the invention.

The feature of the present invention is that in an ultrasonic motor wherein a driving signal is applied to an electro-mechanical energy conversion element provided in a vibration member to thereby excite flexural vibrations of the same shape in the two different planes of said vibration member with a phase difference in time and thereby create rotational motion on the surface of said vibration member, thus frictionally driving a movable member which is in pressure contact with the vibration forming surface, electro-mechanical energy conversion elements for exciting the flexural vibrations are each disposed at a position whereat the sum totals of strains created in the electro-mechanical energy conversion elements are substantially equal to each other.

BRIEF DESCRIPTION OF THE DRAWINGS

FIGS. 18A–18F show an embodiment of an ultrasonic motor according to the present invention, FIG. 18A being a side view of the motor, FIG. 18B showing the amplitude distribution in the radial (r) direction, FIG. 18C showing the strain distribution in the axis (z) direction of the side of the vibration member, FIGS. 18D and 18E being plan views of piezo-electric element plates, and FIG. 18F showing the expanded and contracted state of the piezo-electric element plate when a voltage is applied thereto.

FIGS. 22A–22C show another embodiment, FIG. 22A being a side view of a motor, FIG. 22B showing the amplitude distribution in the radial (r) direction, and FIG. 22C showing the strain distribution in the axial (z) direction of the side of a vibration member.

FIG. 23 is a partly cut-away side cross-sectional view showing another embodiment.

FIGS. 25A–25F show an embodiment of the ultrasonic motor according to the present invention, FIG. 25A being a schematic side view of a vibration member, FIG. 25B showing the amplitude distribution in the radial (r) direction, FIG. 25C showing the strain distribution in the axial (z) direction of the side of a vibration member, FIGS. 25D and 25E being plan views of piezo-electric element plates, and FIG. 25F showing the deformed state of the piezo-electric element plate.

DETAILED DESCRIPTION OF THE PREFERRED EMBODIMENTS

Figure 1:
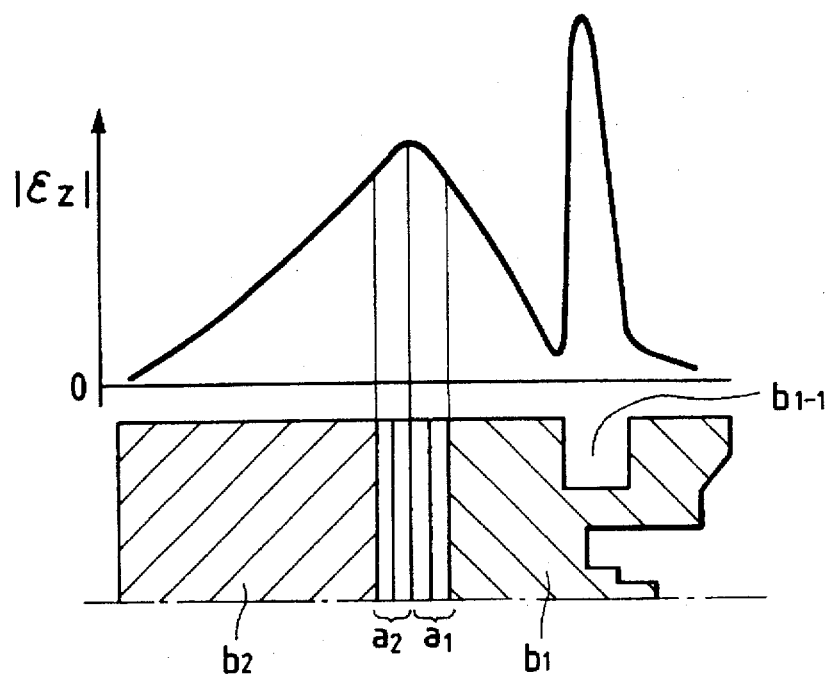
FIG. 1 shows a first embodiment of an ultrasonic motor according to the present invention.
Figure 2:
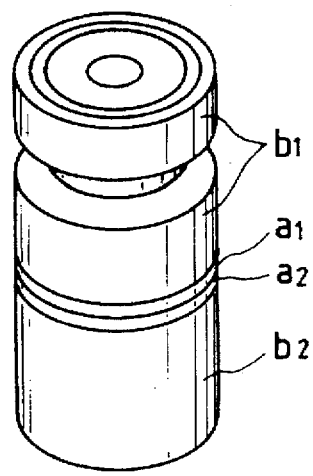
FIG. 2 is a pictorical perspective view of an ultrasonic motor according to the prior art.
Figure 3:
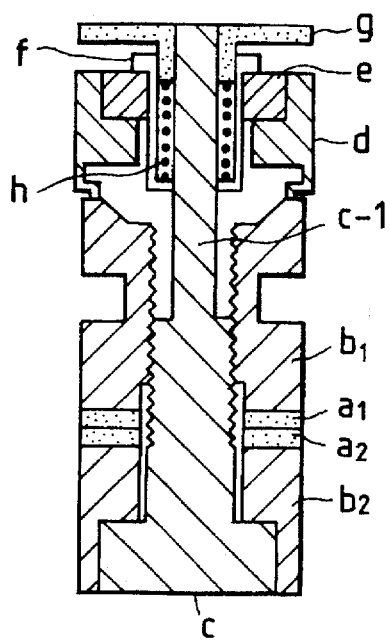
FIG. 3 is a cross-sectional view of the ultrasonic motor according to the prior art.

FIG. 1 shows a first embodiment of an ultrasonic motor according to the present invention, and more particularly shows the relation between a vibration member and the vibration mode thereof. Elements functionally similar to those of the motor according to the prior art are given similar reference characters and need not be described.

This embodiment is one applied to a vibration member in the front portion of which there is formed a circumferential groove $b_1-1$ and in which the vibration amplitude in this circumferential groove $b_1-1$ is made great so that the portion forward thereof may be greatly displaced. Accordingly, the strain ($\epsilon z$) of the vibration member during driving formed rearwardly of the circumferential groove $b_1-1$ of the vibration member is smaller than the strain formed in the circumferential groove portion.

If the sum totals of the flexural vibrations of A phase piezo-electric element $a_1$ (comprised of two piezo-electric element plates) and B phase piezo-electric element $a_2$ (comprised of two piezo-electric element plates) constituting the vibration member are equal, flexural vibrations of equal amplitudes are obtained when voltages of the same magnitude are applied. Therefore, in the present embodiment, the A phase piezo-electric element $a_1$ and the B phase piezo-electric element $a_2$ are disposed on the opposite sides of the peak of a strain curve (the region in which maximum strain is created).

Figure 12:
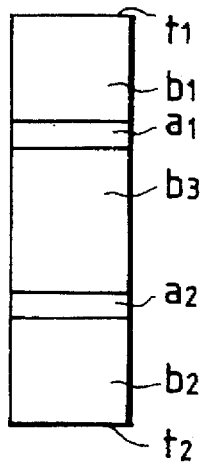
FIG. 12 is a schematic view of a vibration member according to the prior art.
Figure 14:
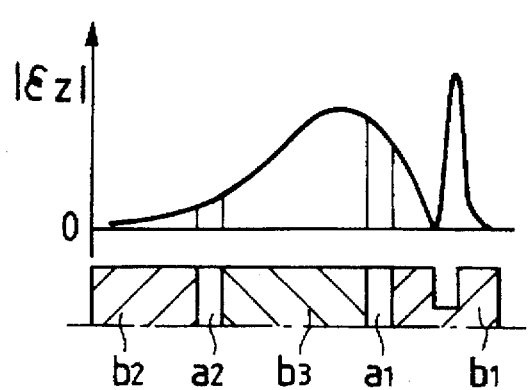
FIG. 14 shows the positional relation between the strain distribution of the vibration member of FIG. 13 and its piezo-electric elements.
Figure 13:
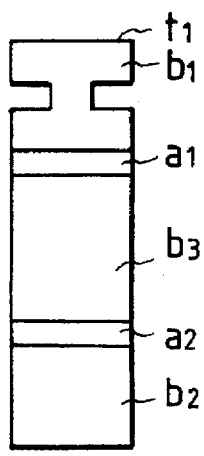
FIG. 13 is a schematic view of a vibration member according to the prior art.

The groups of PZTs for providing flexural vibration need not be disposed in spaced apart relationship with each other as shown in FIGS. 12–14. Rather, it is more advantageous in manufacturing that the groups are closely adjacent to each other. The reason is that a metal block $b_3$ shown in FIGS. 12–14 becomes unnecessary, that the electrode on the boundary surface between the groups can be made common to the groups because the groups are closely adjacent to each other and that the groups can be assembled with the electrode phases of the PZTs of the groups brought into a desired positional relation in advance, and in this case, if necessary, metal blocks $b_1$ and $b_2$ can be joined together for formation before they are coupled together by a bolt.

Figure 4:
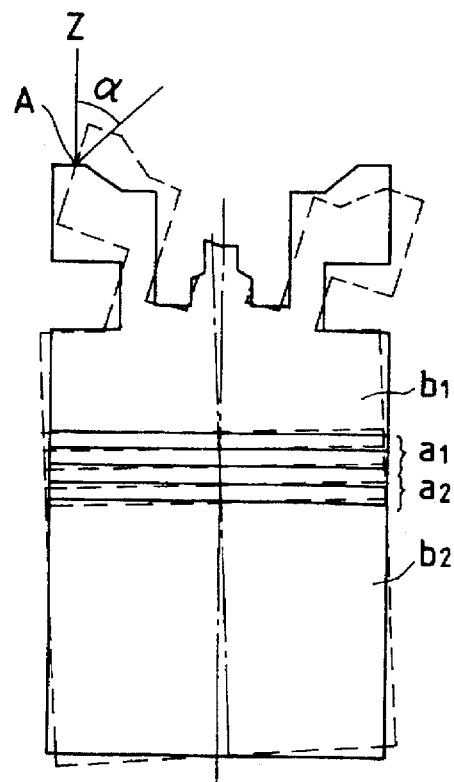
FIG. 4 shows the state of the flexural vibration of the ultrasonic motor according to the prior art.
Figure 5:
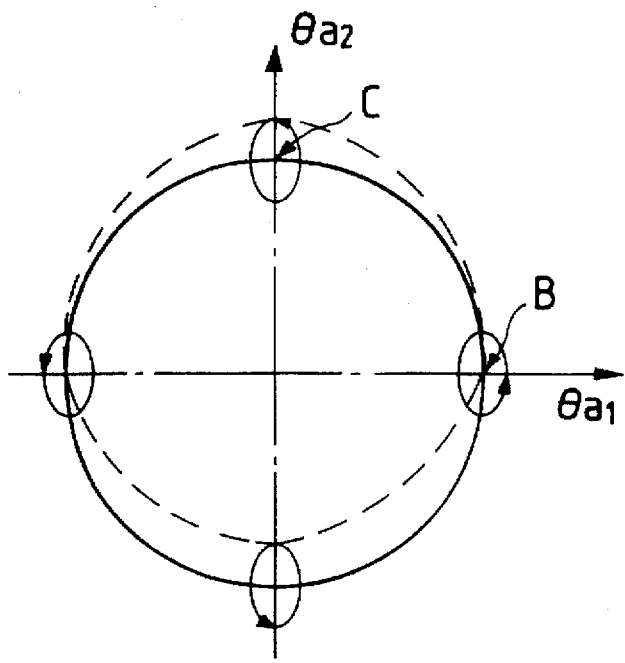
FIG. 5 shows the vibration displacement locus of a vibration member according to the prior art.
Figure 6:
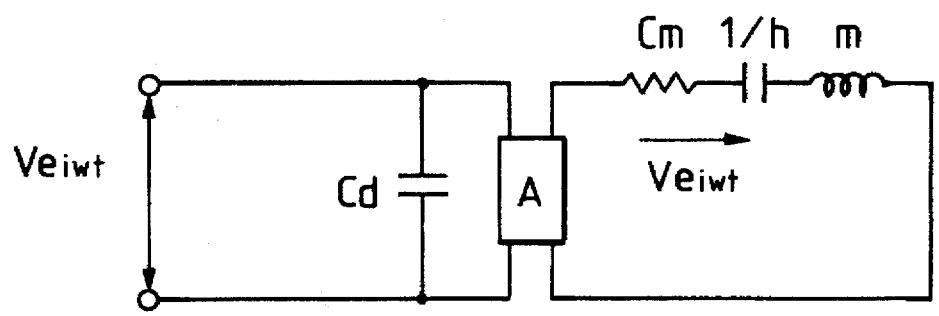
FIG. 6 diagrammatically shows the equivalent circuit of the vibration member according to the prior art.
Figure 7:
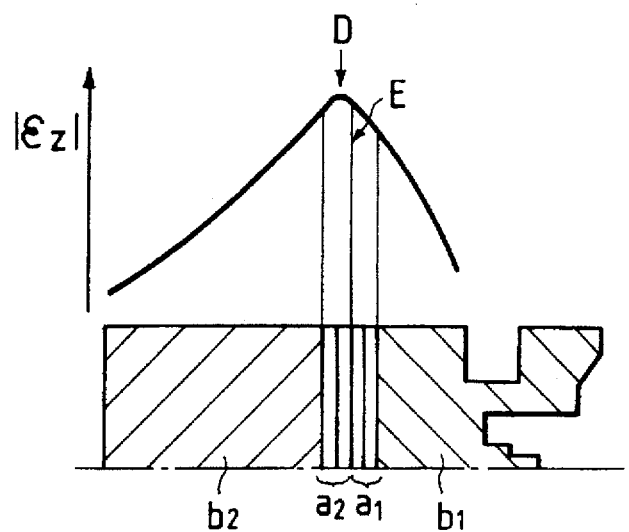
FIG. 7 shows the positional relation between the strain distribution of the vibration member according to the prior art and piezo-electric elements.
Figure 8:
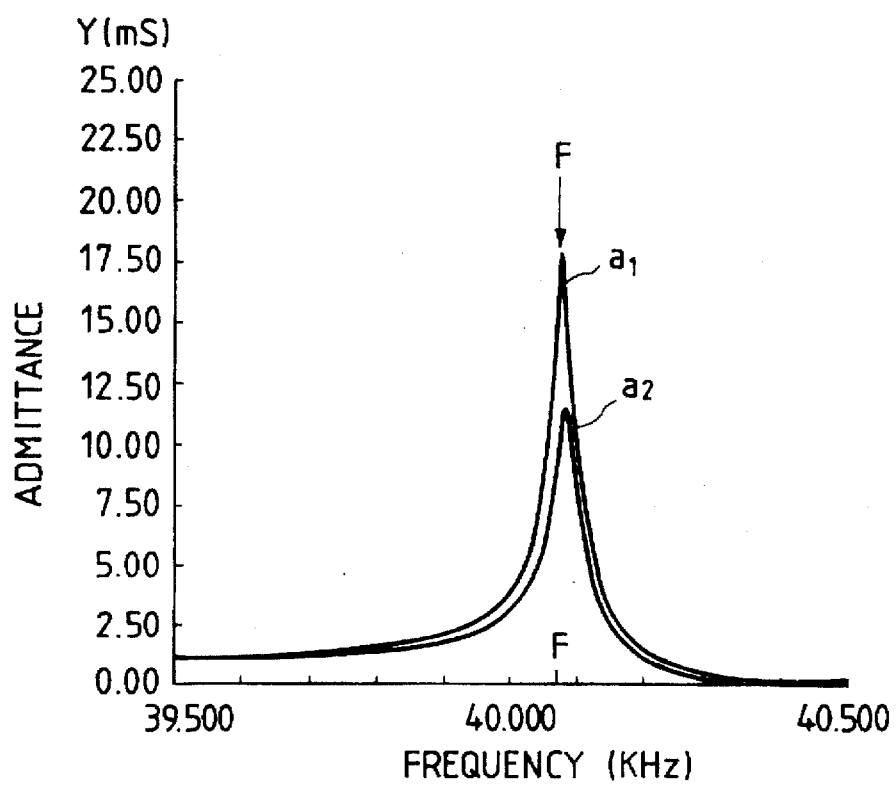
FIG. 8 is a graph showing the vibration characteristic of the prior art.

Examining the conditions hitherto described with respect to the vibration member of this type, the strain distribution of the vibration member shown in FIG. 4 is as shown in FIG. 7. In this case, the B phase piezo-electric element $a_2$ is disposed at a position where strain is great as compared with that of the A phase piezo-electric element $a_1$, and the admittance during the driving of the B phase piezo-electric element $a_2$ is always great as compared with the admittance during the driving of the A phase piezo-electric element $a_1$. In the present embodiment (FIG. 1), in order to correct this, E (see FIG. 7) which is the boundary surface between the A phase and B phase piezo-electric elements $a_1$ and $a_2$ is moved to the maximum point D of the strain distribution (i.e., the maximum point D of the vibration amplitude), and the rear metal block $b_2$ is made short and the fore metal block $b_1$ is made long.

Figure 9:
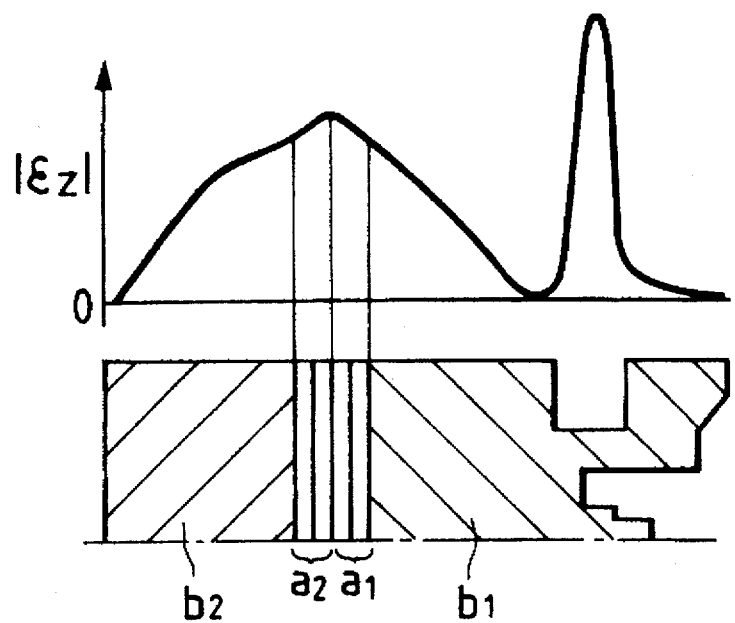
FIG. 9 shows a modification of the first embodiment.

An embodiment shown in FIG. 9, like the embodiment shown in FIG. 1, achieves the coincidence between the maximum value position of the vibration member utilizing a secondary flexural moment and the boundary surface between the A phase piezo-electric element $a_1$ and the B phase piezo-electric element $a_2$, and in this embodiment, as compared with the embodiment shown in FIG. 1, the maximum value position of strain is formed on the rear end side of the vibration member.

Figure 10:
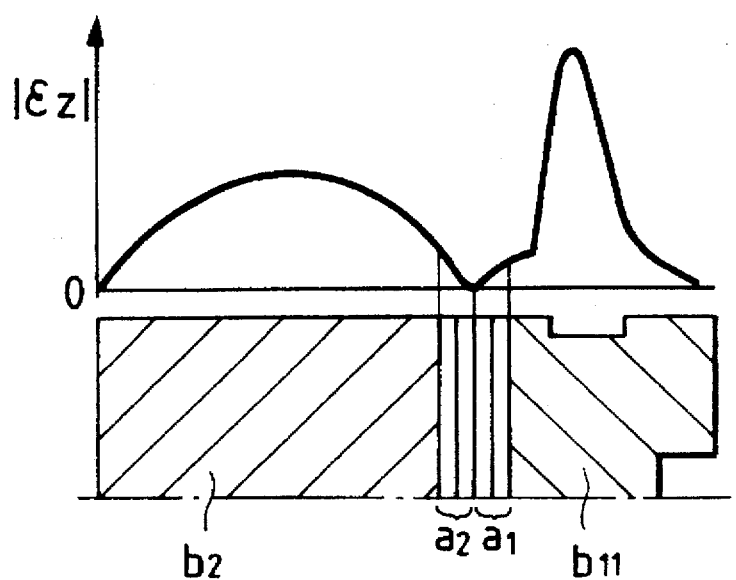
FIG. 10 shows a modification of the first embodiment.

In an embodiment shown in FIG. 10, conversely from the embodiment shown in FIGS. 1 and 9, the minimum value position of the vibration member and the boundary surface between the A phase piezo-electric element $a_1$ and the B phase piezo-electric element $a_2$ are made coincident with each other. In the case of the present embodiment, the strain created in the boundary surfaces between fore end rear metal blocks $b_2$ and $b_{11}$ for obtaining a predetermined amplitude in the vibration member and the piezo-electric elements $a_1$ and $a_2$ and in the boundary surface between the piezo-electric elements is small and the mechanical loss therein decreases and thus, the motor efficiency is improved.

Figure 15:
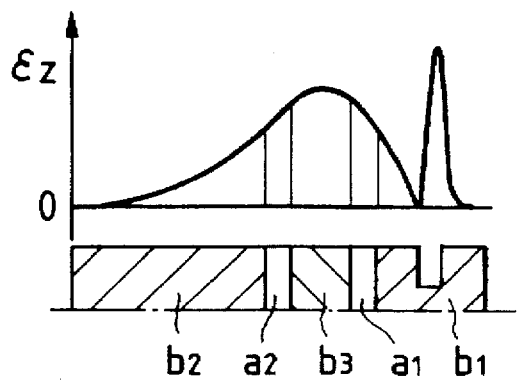
FIG. 15 shows the positional relation between the strain distribution of a vibration member according to a second embodiment and its piezo-electric elements.

FIG. 15 shows a second embodiment of the present invention.

In the present embodiment, like the vibration members shown in FIGS. 13 and 14, the A phase piezo-electric element $a_1$ is disposed between the fore metal block $b_1$ and the middle metal block $b_3$ and the B phase piezo-electric element $a_2$ is disposed between the middle metal block $b_3$ and the rear metal block $b_2$, and the A phase piezo-electric element $a_1$ and the B phase piezo-electric element $a_2$ are disposed at positions equal in the longitudinal direction from the maximum position of the strain formed in the vibration member. The strains at these two positions are equal and thus, the amplitudes of flexural vibrations excited by the A phase and B phase piezo-electric elements $a_1$ and $a_2$ become equal to each other.

Figure 16:
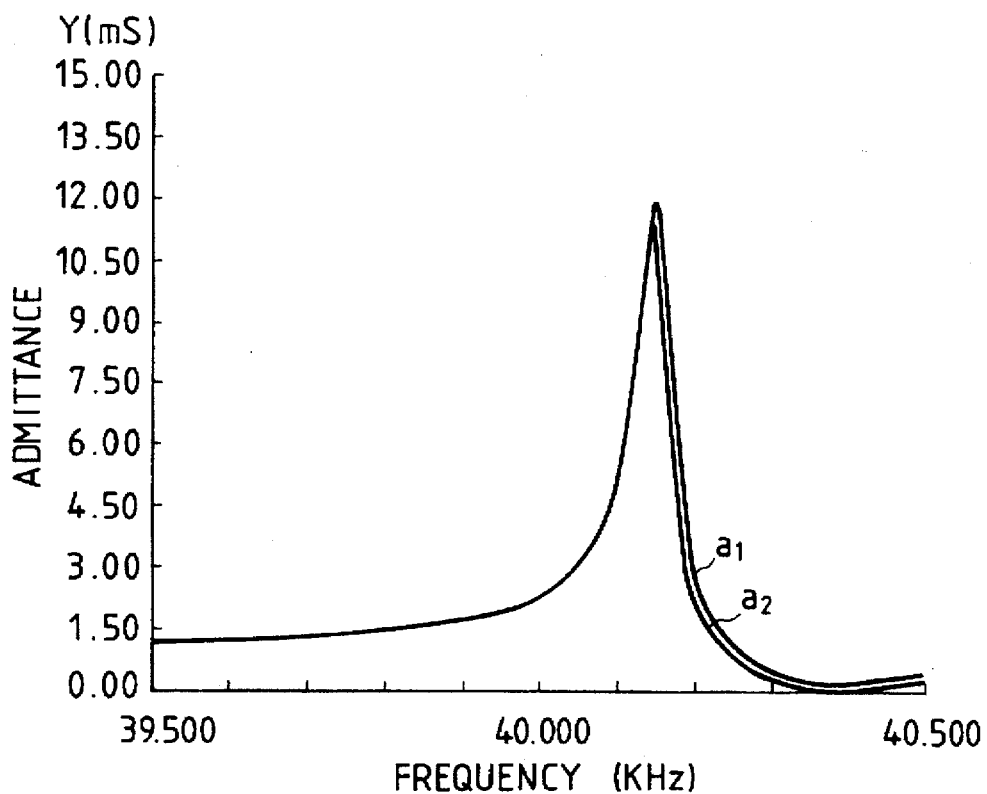
FIG. 16 is a graph showing the vibration characteristic of the vibration member of FIG. 15.

FIG. 16 shows the admittances during the driving of the A phase piezo-electric element $a_1$ and the B phase piezo-electric element $a_2$. In this case, the two admittances are substantially coincide with each other, the vibration displacement locus at each point on the vibration member when the A phase piezo-electric element $a_1$ and the B phase piezo-electric element $a_2$ are driven by the same voltage becomes circular, the sliding loss between the movable member and the vibration member decreases, and the motor efficiency is improved.

Figure 17:
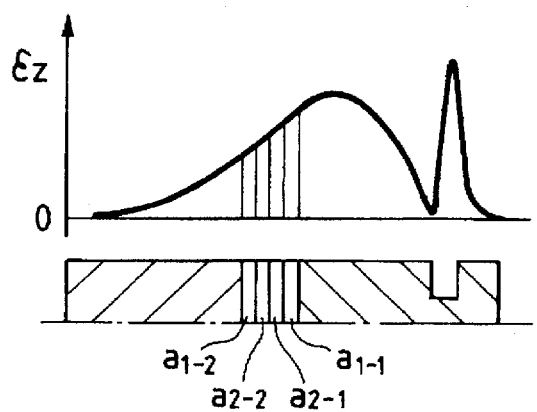
FIG. 17 shows the positional relation between the strain distribution of a vibration member according to a third embodiment and its piezo-electric elements.

FIG. 17 shows a third embodiment of the present invention.

In each of the above-described embodiments, electro-mechanical energy conversion elements for exciting a flexural vibration have been considered to be unit comprising one set of two elements, but a similar effect will be obtained even if they are separately disposed. That is, assuming that a flexural vibration is excited by piezo-electric element plates $a_1$–1 and $a_1$–2 and a flexural vibration is excited by piezo-electric element plates $a_2$–1 and $a_2$–2, if these four piezo-electric element plates are disposed at a position of the construction shown in FIG. 17 wherein the strain distribution varies substantially linearly, the strain in the piezo-electric element plate $a_1$–1 is great and the strain in the piezo-electric element plate $a_2$–2 is small and thus, the strain per one phase, i.e., the sum of the strains in the two piezo-electric element plates becomes substantially equal to the strain per the other phase, i.e., the sum of the strains in the piezo-electric element plates $a_2$–1 and $a_2$–2.

Figure 11:
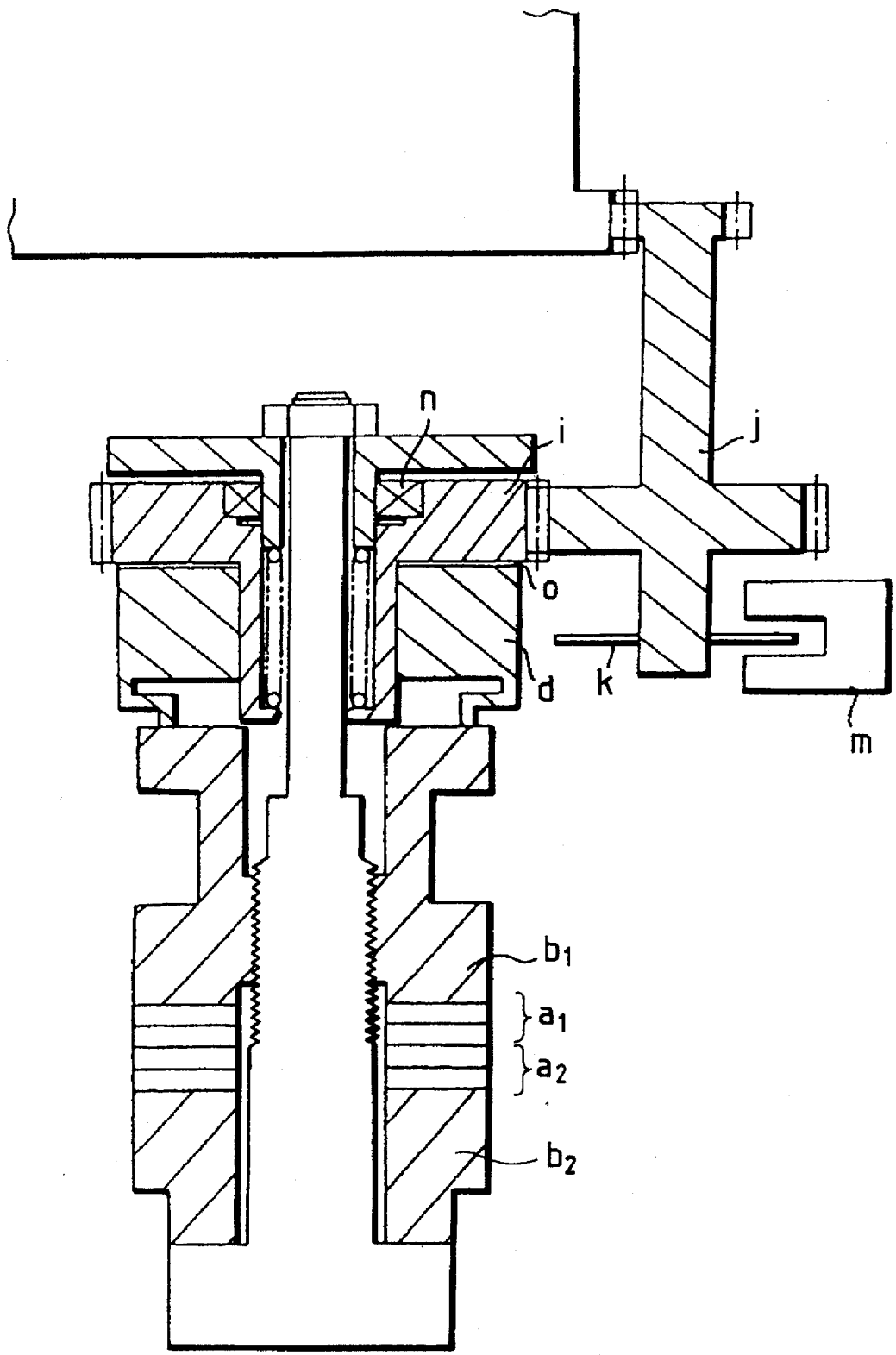
FIG. 11 is a schematic view of a driving apparatus using an ultrasonic motor as a drive source.

FIG. 11 shows a driving apparatus for a photo-taking lens of a camera utilizing the bar-like ultrasonic motor of the present invention as a drive source. In FIG. 11, the letter i designates an output take-out gear which is coupled to a movable member d through anti-vibration butyl rubber o. A connection gear j has mounted thereon an encoder slit plate k and a photocoupler m for detecting the position of said lens, and these detect the rotated position of the gear.

FIGS. 18A–18F show an embodiment of the ultrasonic motor according to the present invention, FIG. 18A being a schematic view of the vibration member thereof.

In the present embodiment, a vibration member 100A is formed in a construction similar to the example of the prior art, and piezo-electric element plates 103 and 104 shown in FIGS. 18D and 18E are sandwiched and fixed between vibratory resilient members 100 and 102 made of a metal (SUS, Bs, Al, INVAR or the like).

The piezo-electric element plates 103 and 104, as shown in FIGS. 18D and 18E, each have positive and negative polarized patterns formed on the opposite sides of the diametrical portion thereof, and are disposed with a phase difference of 90° therebetween. When magnetic fields of the same direction are applied to these piezo-electric element plates 103 and 104 in the direction of the thickness thereof, the piezo-electric element plates 103 and 104 are deformed as indicated by broken line in FIG. 18F.

Accordingly, if the electric fields are alternating ones and the frequencies thereof are adjusted to the natural frequency of the flexure of the vibration member, the vibration member will make flexural resonation (the amplitude distribution in the radial (r) direction shown in FIGS. 18A and 18B).

Also, since the piezo-electric element plate 104 is disposed with a phase difference of 90° with respect to the piezo-electric element plate 103, the flexural vibration created thereby is flexural vibration having a phase difference of 90° in a direction θ with respect to the flexural vibration created by the piezo-electric element plate 103.

Further, by a time phase difference of 90° being provided between the flexural vibration created by the piezo-electric element plate 104 and the flexural vibration created by the piezo-electric element plate 103, the particles on the surface of the vibration member a make circular or elliptical motion.

FIG. 18C shows the strain distribution in the z direction of the side of the vibration member corresponding to the amplitude distribution in the r direction, the position at which the piezo-electric element plates 103 and 104 are sandwiched and fixed is selected to be the antinode position of the inherent vibration mode for driving shown in FIG. 18B at which the strain becomes greatest.

Figure 19:
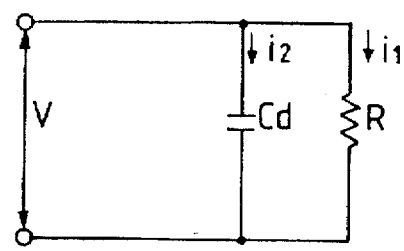
FIG. 19 is a diagram of the electric equivalent circuit of the vibration member.

Now, considering the equivalent circuit of the vibration member, there is only a resistance component on the mechanical arm side during resonation, as shown in FIG. 19.

Accordingly, supplied electric power is $P = Vi_1$, but $i_1$ is determined by the total amount of strain of the piezo-electric element plates (the piezo-electric elements create charges by strain).

That is, by the piezo-electric element plates 103 and 104 being disposed at a position whereat strain is great, as shown in FIG. 18C, i.e., the antinode position of the strain, the electric current becomes great and the voltage becomes small and thus, there is provided a construction of low voltage.

Figure 20A:
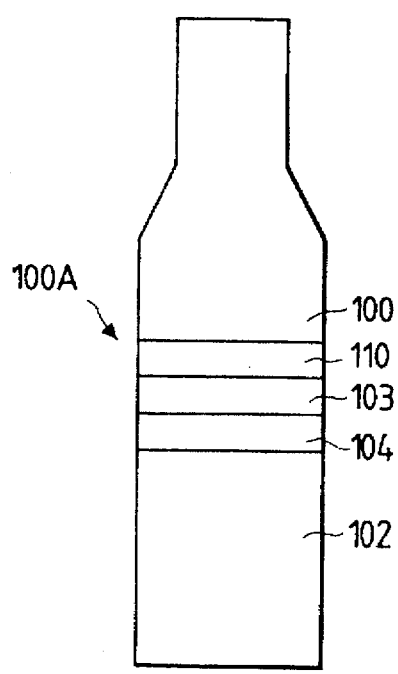
FIGS. 20A–20C show a modification of the embodiment shown in FIGS. 18A–18F, FIG. 20A being a side view of a motor, FIG. 20B showing the amplitude distribution in the radial (r) direction, and FIG. 20C showing the strain distribution in the axial (z) direction of the side of a vibration member.
Figure 20B:
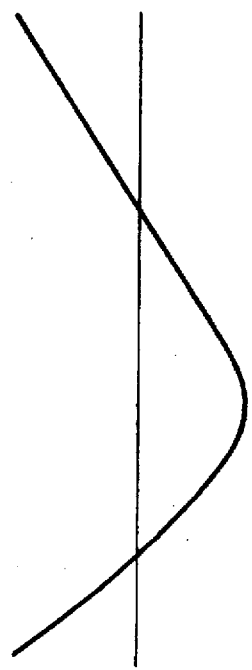
Figure 20C:

Even where as shown in FIGS. 20A–20C, a piezo-electric element plate 110 for vibration detection is provided, it is necessary in the construction of the low voltage type to provide the piezo-electric element plates 103 and 104 for driving at the maximum strain position as in the case shown in FIGS. 18A–18F.

FIGS. 21A–21D show another embodiment.

Figures 21A, 21B, 21C:
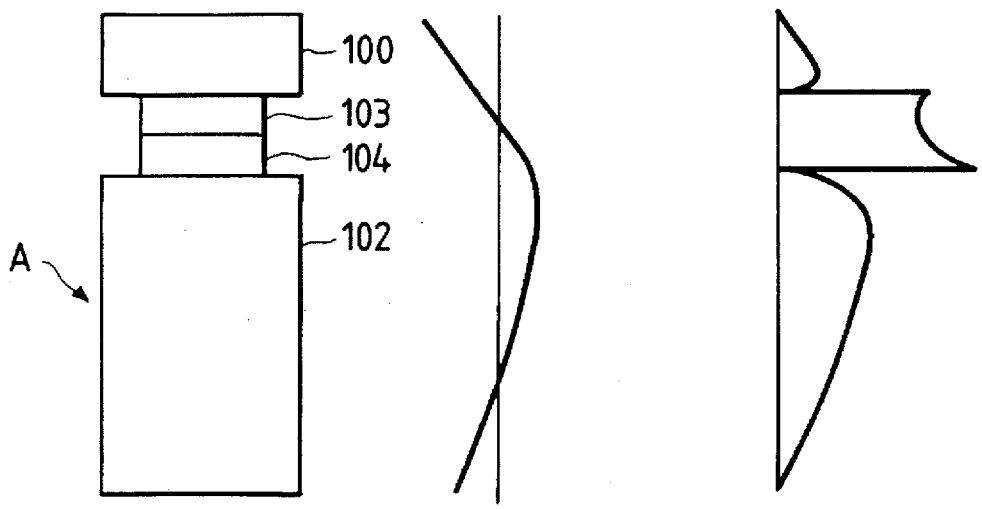
FIGS. 21A–21D show another embodiment, FIG. 21A being a side view of a motor, FIG. 21B showing the amplitude distribution in the radial (r) direction, FIG. 21C showing the strain distribution in the axial (z) direction of the side of a vibration member, and FIG. 21D showing a vibration state of the vibration member.
Figure 21D:
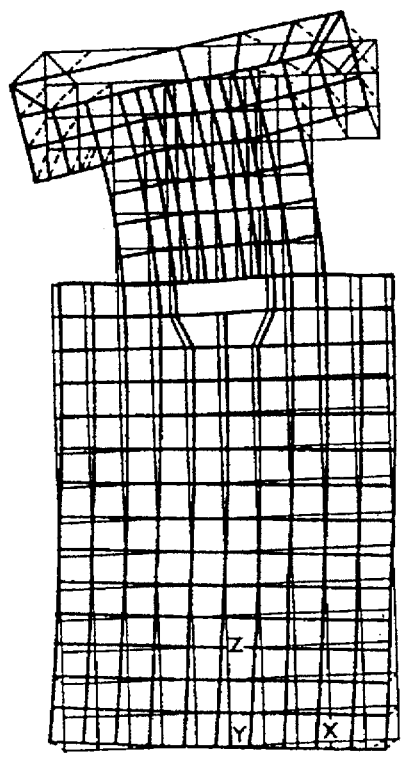

This embodiment is one in which the vibration member has a constricted portion, and in the vibration mode shown in FIG. 21D, the maximum strain position and the vibration antinode position are not coincident with each other as shown in FIGS. 21B and 21C, but the piezo-electric element plates 103 and 104 are disposed in the constricted portion which is the maximum strain position.

Again in this case, as in the embodiment shown in FIGS. 18A–18F, there is an effect as in the low voltage type.

When in actual mounting or manufacturing, it is difficult to dispose the piezo-electric element plates 103 and 104 in the constricted portion, the piezo-electric element plates 103 and 104 may be provided on the opposite sides of the antinode in which strain is next greatest, as shown in FIGS. 22A–22C.

FIG. 23 shows still another embodiment.

This embodiment is similar in outward appearance to the embodiment of FIGS. 22A–22C, but the inner diameters of the piezo-electric element plates 103 and 104 are made large and these piezo-electric element plates are disposed on the outer peripheral portion of the vibration member in which strain is great.

In the present embodiment, the total amount of strain somewhat decreases, but since the piezo-electric element plates 103 and 104 are disposed only on the opposite sides of the maximum strain position in the axial and radial directions of the vibration member, the strain per unit volume of the piezo-electric element plates 103 and 104 becomes greatest, and such location of disposition can be effectively utilized and the number of piezo-electric elements required may be small.

Also, the area of contact between the piezo-electric element plate 103 and the fore vibratory resilient member 100 and the area of contact between the piezo-electric element plate 104 and the rear vibratory resilient member 102 decrease and therefore, the friction loss resulting from sliding therebetween can be made small.

Figure 24:
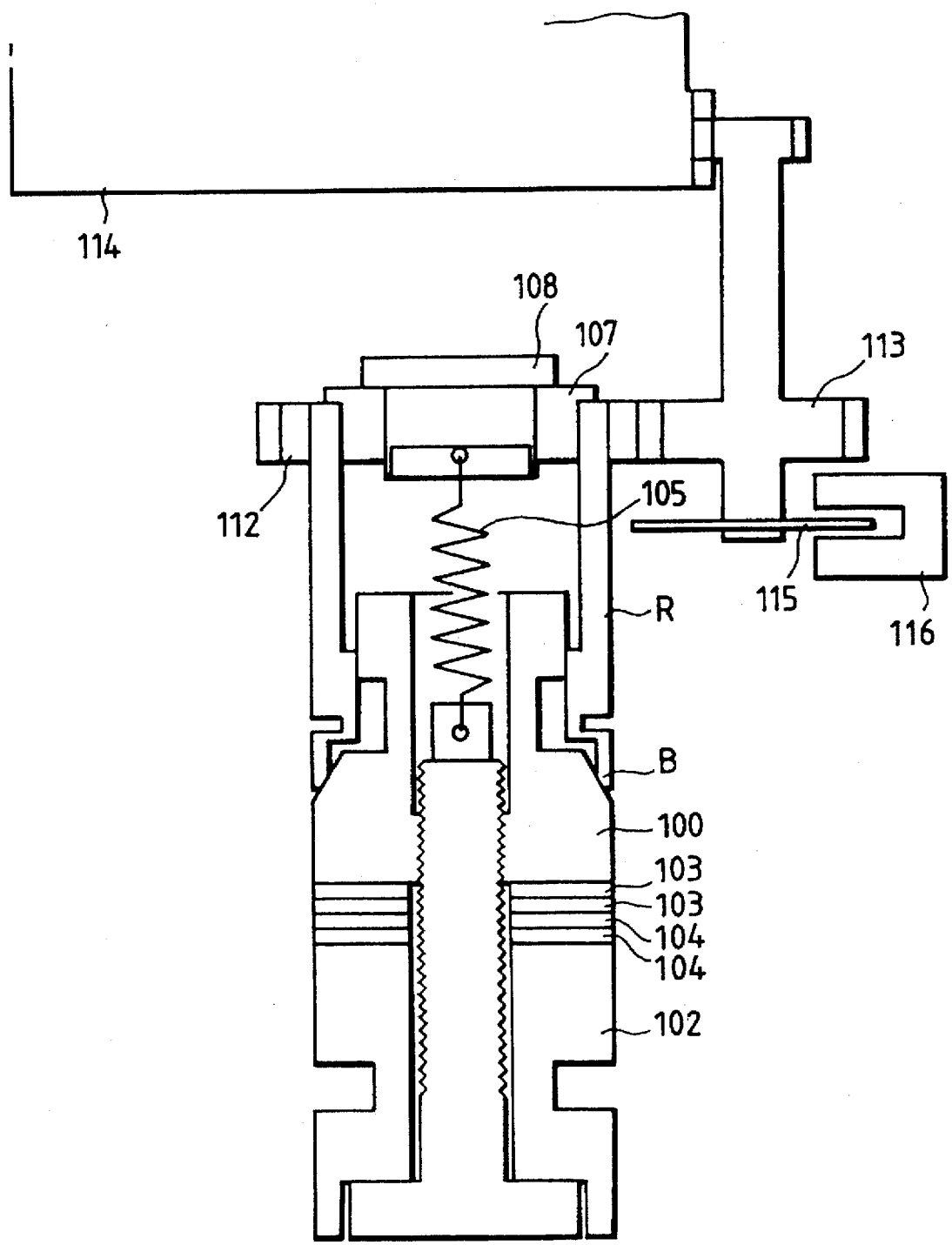
FIG. 24 is a cross-sectional view of an apparatus using an ultrasonic motor.

FIG. 24 shows an embodiment in which the barrel of an optical lens is driven by the use of the motor according to the present invention.

The reference numeral 112 designate a gear joined coaxially with a movable member 108 to transmit the rotational output of the motor to a gear 113 and rotate the lens barrel 114 of a camera which has a gear meshing with the gear 113.

An optical type encoder slit plate 115 is disposed coaxially with the gear 113 to detect the rotated positions and rotational speeds of the movable member 108 and the lens barrel 114, and detects the positions and speed by a photocoupler 116.

FIGS. 25A–25F show an embodiment of the ultrasonic motor according to the present invention.

The vibration member A of the present embodiment, as shown in FIG. 25A, is similar in basic construction to the example of the prior art, and piezo-electric element plates 203 and 204 shown in FIGS. 25D and 25E are sandwiched and fixed between resilient members made of a metal (SUS, Bs, Al, ZNUAR or the like).

The piezo-electric element plates 203 and 204 each are polarized in opposite directions with the non-electrode portion of the diametrical part thereof as a boundary, and when electric fields of the same direction are applied to the two polarized areas in the direction of the thickness thereof, the piezo-electric element plates are deformed into a shape as indicated by dotted line in FIG. 25F.

Accordingly, if the electric fields are alternating ones and the frequencies thereof are adjusted to the natural frequency of the flexure of the vibration member, the entire vibration member will make resonation of flexural mode, as shown in FIG. 25B.

On the other hand, the piezo-electric element plates 203 and 204 are disposed with a phase difference of 90° therebetween and therefore, flexural vibrations created by these two piezo-electric element plates 203 and 204 have a phase difference of 90° therebetween in a direction 8.

Accordingly, by a time phase difference of 90° being provided between the flexural vibration created by the piezo-electric element plate 204 and the flexural vibration created by the piezo-electric element plate 203, the particles on the surface of the vibration member make circular or elliptical motion and at that time, the strain distribution in the z (axial) direction of the side of the vibration member corresponding to the amplitude distribution in the r direction shown in FIG. 25B becomes such as shown in FIG. 25C.

Description will now be made of the position at which a piezo-electric element plate for enhancing the efficiency of the motor is disposed.

To obtain a certain constant motor output, if energy dispersed by the members other than the vibration member is made constant with the other conditions such as the support of the vibration member, the structure of the movable member (rotor) and the sliding material being fixed, the vibration energy being accumulated (created) by the vibration member need be of a certain predetermined amount.

Now, the energy to be supplied in order to obtain a certain amount of vibration energy is determined by the attenuation constant of the entire vibration member.

The vibration member is comprised of a combination of a vibration structure made of a metal (such as aluminum, brass or stainless steel) and a piezo-electric element plate. Also, the attenuation constant inherent to a material is small for metals, and the attenuation constant of the piezo-electric element plate having the piezo-electric property is relatively great. Q of metals is of the order of 3000–10000, and Q of the piezo-electric element plate is of the order of 20–1800.

Accordingly, to decrease the loss in the vibration member, i.e., the internal friction loss caused by the material being distorted (although there are other losses including the radiation loss into the air and the dielectric material loss in the piezo-electric element plate, these losses are small), it is desirable that the piezo-electric element plate having a relatively great attenuation constant be disposed in a portion of small strain.

So, in the present embodiment, the position of the antinode of vibration at which strain is great is avoided and piezo-electric element plates are disposed before and behind the position of the middle node.

In fact, Q of the vibration member when the piezo-electric element plates 203 and 204 were disposed at the antinode position of vibration was of the order of 1000, but in the present embodiment, it has been improved to the order of 1500.

Also, at the node of vibration near the opposite ends of the vibration member A, strain is not zero but is small as compared with that near the antinode of vibration and therefore, even if the piezo-electric element plates 203 and 204 are disposed at this node position, some improvement in the motor efficiency can be expected.

Strain is zero at the opposite ends of the vibration member, but it is impossible in the structure of the present motor to dispose the piezo-electric element plates at these positions.

Figure 26A:
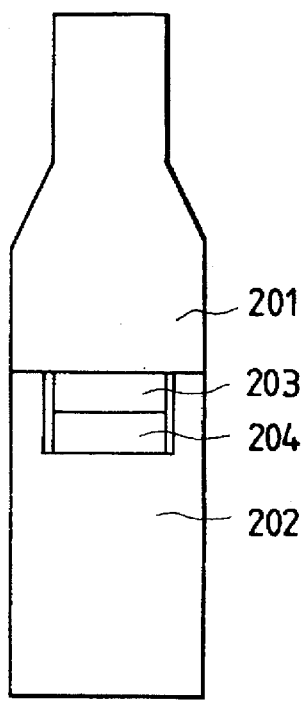
FIGS. 26A–26C show another embodiment, FIG. 26A being a schematic cross-sectional view of a vibration member, FIG. 26B showing the amplitude distribution in the radial (r) direction, and FIG. 26C showing the strain distribution in the axial (z) direction of the side of the vibration member.
Figure 26B:
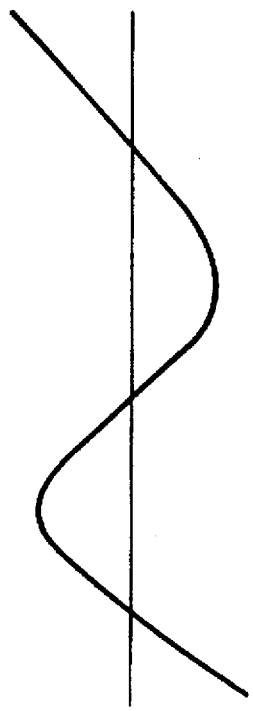
Figure 26C:
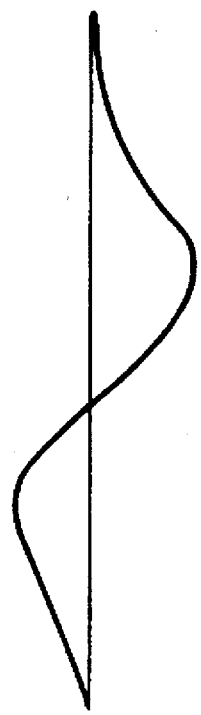

FIGS. 26A–26C show another embodiment.

In this embodiment, as in the embodiment described above, the piezo-electric element plates 203 and 204 are disposed before and behind the node position of vibration, but the outer diameters of the piezo-electric element plates 203 and 204 are made small and the piezo-electric element plates 203 and 204 are disposed inside the vibration member of small strain.

By adopting such structure, the internal loss in the vibration member becomes smaller than in the embodiment of FIGS. 25A–25F.

Figures 27A, 27B:
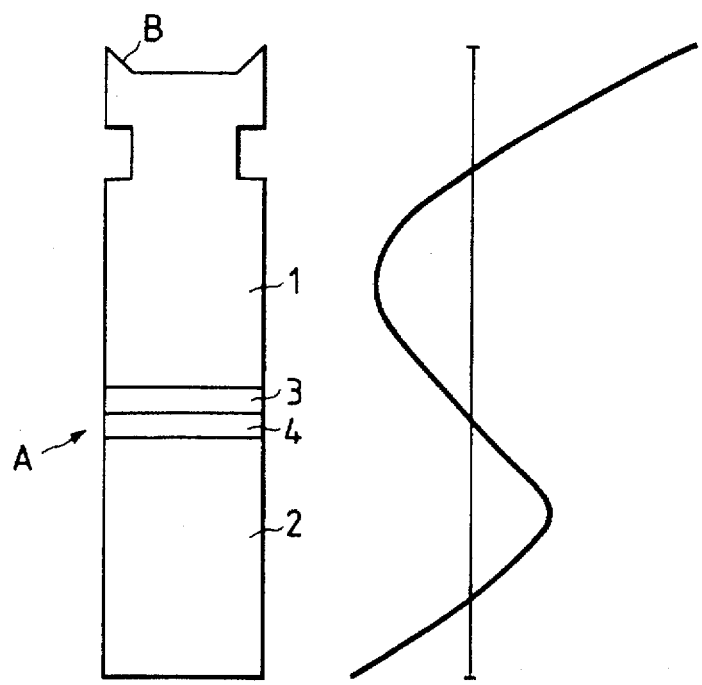
FIGS. 27A and 27B and FIGS. 28A and 28B show the shapes and the amplitude distributions in the radial (r) direction, respectively, of further vibration members.
Figures 28A, 28B:
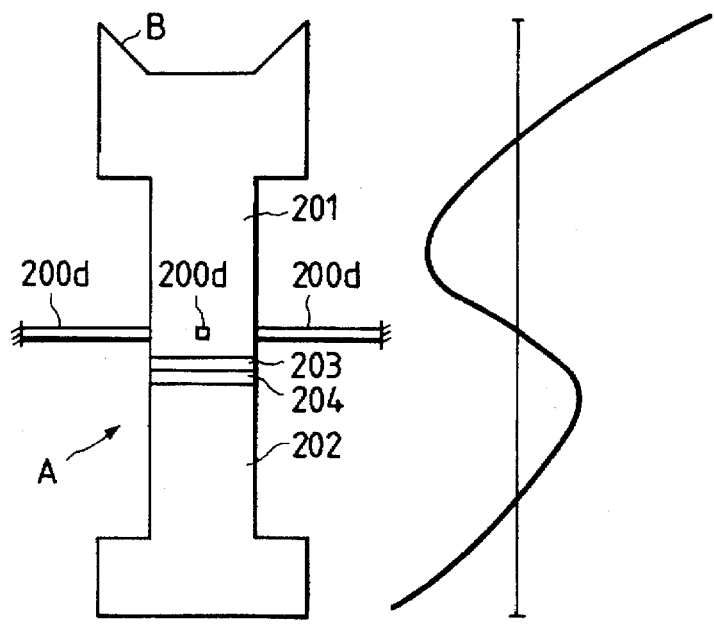

In the present invention, the shape of the vibration member is not limited to the pencil-like shape, but may also be a shape having a constricted portion in the intermediate portion, as shown in FIGS. 26A and 26B, or a shape having a large diameter in the opposite end portions, as shown in FIGS. 27A and 27B.

Also, as shown in FIGS. 27A and 27B, where the vibration member is supported at the node position of vibration by a support member comprising a resilient bar or a resilient plate, there will be substantially no problem even if the piezo-electric element plates 203 and 204 are disposed somewhat off the node position of vibration.

Figure 29:
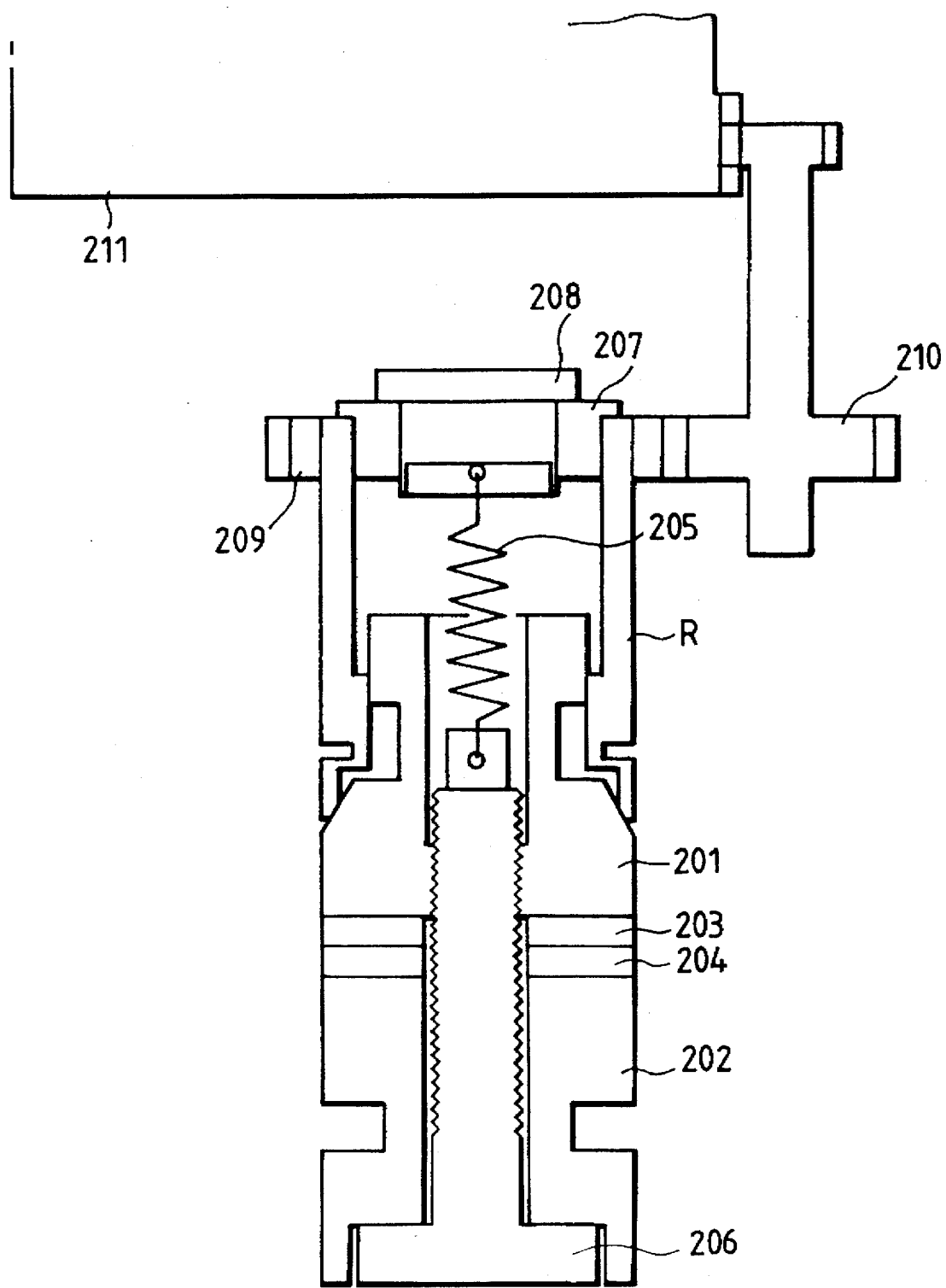
FIG. 29 shows an apparatus using the ultrasonic motor of the present invention as a drive source.

FIG. 29 shows an example of the construction in a case where the barrel of an optical lens is driven by the use of the motor according to the present invention.

The reference numeral 209 denotes a gear joined coaxially with a movable member R to transmit the rotational output of the motor to a gear 210 and rotate the lens barrel 211 of a camera which has a gear meshing with the gear 210.

As described above, according to the present invention, the motor efficiency can be improved by simple structure in which electro-mechanical energy conversion elements such as piezo-electric element plates are disposed at or near the node position of vibration for driving.

What is claimed is:

1. A vibration driven motor comprising:
   a vibration member said vibration member being substantially bar-shaped with a central portion, and having an asymmetrical shape in an axial direction of said vibration member relative to the central portion;
   a first electro-mechanical energy conversion member including a first section polarized in a predetermined direction and a second section polarized in a direction different from said predetermined direction, said first energy conversion member being functionally coupled to said vibration member; and
   a second electro-mechanical energy conversion member including a first section polarized in a predetermined direction and a second section polarized in a direction different from said predetermined direction, said second energy conversion member being located with a spatial phase difference with respect to said first energy conversion member and being functionally coupled to said vibration member;
   wherein said first energy conversion member is arranged to generate a first flexural vibration having a first direction in said vibration member in response to a first electrical signal and said second energy conversion member is arranged to generate a second flexural vibration having a second direction different from said first flexural vibration in response to a second electrical signal, thereby to generate a combined vibration of the first flexural vibration and the second flexural vibration in said vibration member, and wherein each of said first energy conversion member and said second energy conversion member is located at a predetermined position whereat, during operation, the sum totals of strains created in the respective conversion members are substantially equal to each other.

2. A vibration driven motor according to claim 1, further comprising signal generating means for generating a first electrical signal and a second electrical signal, wherein said second electrical signal has a phase difference in time with respect to said first electrical signal.

3. A vibration driven motor according to claim 2, wherein said phase difference in time is 90°.

4. A vibration driven motor according to claim 1, wherein said spatial phase difference is 90°.

5. A vibration driven motor according to claim 1, wherein said first energy conversion member includes a linear insulation portion for insulating said first section and said second section.

6. A vibration driven motor according to claim 1, wherein said second energy conversion member includes a linear insulation portion for insulating said first section and said second section.

7. A vibration driven motor according to claim 2, wherein said first energy conversion member and said second energy conversion member each are disposed at a position in which the distribution of the strain of the vibration comprising the first flexural vibration combined with the second flexural vibration is substantially maximum or substantially minimum at a boundary surface.

8. A vibration driven motor according to claim 1, wherein a peripheral groove is formed in said vibration member at one axial side thereof relative to the central portion.

9. A vibration driven motor comprising:
   a vibration member, said vibration member being substantially bar-shaped with a central portion, and having an asymmetrical shape in an axial direction of said vibration member relative to the central portion;
   a first electro-mechanical energy conversion member functionally coupled to said vibration member and arranged for generating a first flexural vibration having a first direction in said vibration member in response to a first electrical signal; and
   a second electro-mechanical energy conversion member located with a spatial phase difference with respect to said first energy conversion member and functionally coupled to said vibration member and arranged for generating a second flexural vibration having a second direction different from said first flexural vibration in response to a second electrical signal, thereby to generate a combined vibration of the first flexural vibration and the second flexural vibration in said vibration member;
   wherein each of said first energy conversion member and said second energy conversion member is located at a predetermined position whereat, during operation, the sum totals of strains created in the respective conversion members are substantially equal to each other.

10. A vibration driven motor according to claim 9, further comprising signal generating means for generating a first electrical signal and a second electrical signal, wherein said second electrical signal has a phase difference in time with respect to said first electrical signal.

11. A vibration driven motor according to claim 10, further comprising a contact member to be driven by said combined vibration.

12. A vibration driven motor according to claim 9, wherein a peripheral groove is formed in said vibration member at one axial side thereof relative to the central portion.

13. A system having a vibration driven motor as a drive source, said system comprising:
   a vibration member, said vibration member being substantially bar-shaped with a central portion, and having an asymmetrical shape in an axial direction of said vibration member relative to the central portion;
   a first electro-mechanical energy conversion member functionally coupled to said vibration member and arranged for generating a first flexural vibration having a first direction in said vibration member in response to a first electrical signal;
   a second electro-mechanical energy conversion member located with a spatial phase difference with respect to said first energy conversion member and functionally coupled to said vibration member and arranged for generating a second flexural vibration having a second direction different from said first flexural vibration in response to a second electrical signal, thereby to generate a combined vibration of the first flexural vibration and the second flexural vibration in said vibration member;

a contact member in contact with said vibration member and driven by the combined vibration; and a load member driven by a force from the contact member;

wherein each of said first energy conversion member and said second energy conversion member is located at a predetermined position whereat, during operation, the sum totals of strains created in the respective conversion members are substantially equal to each other.

14. A vibration driven motor according to claim 13, wherein a peripheral groove is formed in said vibration member at one axial side thereof relative to the central portion.

15. A vibration device for a vibration driven actuator comprising:

a vibration member, said vibration member being substantially bar-shaped with a central portion, and having an asymmetrical shape in an axial direction of said vibration member relative to the central portion;

a first electro-mechanical energy conversion member functionally coupled to said vibration member and arranged for generating a first flexural vibration having a first direction in said vibration member in response to a first electrical signal; and a second electro-mechanical energy conversion member located with a spatial phase difference with respect to said first energy conversion member and functionally coupled to said vibration member and arranged for generating a second flexural vibration having a second direction different from said first flexural vibration in response to a second electrical signal, thereby to generate a combined vibration of the first flexural vibration and the second flexural vibration in said vibration member;

wherein each of said first energy conversion member and said second energy conversion member is located at a predetermined position whereat, during operation, the sum totals of strains created in the respective conversion members are substantially equal to each other.

16. A vibration driven motor according to claim 15, wherein a peripheral groove is formed in said vibration member at one axial side thereof relative to the central portion.

17. A vibration driven motor, comprising:

a vibration member, said vibration member being substantially bar-shaped with a central portion, and having an asymmetrical shape in an axial direction of said vibration member relative to the central portion;

a first electro-mechanical energy conversion member arranged for generating a first flexural vibration having a first direction in said vibration member; and a second electro-mechanical energy conversion member arranged for generating a second flexural vibration having a second direction different from said first direction in said vibration member, thereby to generate a combined vibration of the first and second vibration in the vibration member;

wherein each of said first electro-mechanical energy conversion element and said second electro-mechanical energy conversion element is located at a respective portion an equal or substantially equal distance from a peak position of an amplitude of the combined vibration during operation.

18. A vibration driven motor according to claim 17, wherein one terminal surface of said first electro-mechanical energy conversion element and one terminal surface of said second electro-mechanical energy conversion element are located so as to substantially contact each other at opposite sides of the peak portion of the amplitude of the combined vibration.

19. A vibration driven motor according to claim 17, wherein a peripheral groove is formed in said vibration member at one axial side thereof relative to the central portion.

20. A vibration driven motor, comprising:

a vibration member, said vibration member being substantially bar-shaped with a central portion, and having an asymmetrical shape in an axial direction of said vibration member relative to the central portion;

a first electro-mechanical energy conversion member arranged for generating a first flexural vibration having a first direction in said vibration member; and a second electro-mechanical energy conversion member arranged for generating a second flexural vibration having a second direction different from said first direction in said vibration member, thereby to generate a combined vibration of the first and second vibration in the vibration member;

wherein each of said first conversion member and said second conversion member is located at a respective portion whereat, when said combined vibration is generated in said vibration member during operation, a sum total of strain formed in said first conversion member and a sum total of strain formed in said second conversion member are equal or substantially equal to each other.

21. A vibration driven motor according to claim 20, wherein a peripheral groove is formed in said vibration member at one axial side thereof relative to the central portion.

* * * * *

UNITED STATES PATENT AND TRADEMARK OFFICE
CERTIFICATE OF CORRECTION

PATENT NO.  : 5,726,515
DATED       : March 10, 1998
INVENTOR(S) : TAKAYUKI TSUKIMOTO, ET AL.

It is certified that error appears in the above-identified patent and that said Letters Patent is hereby corrected as shown below:

Column 2

Line 28, "mass" should read --mass.--

Column 7

Line 13, "coincide" should read --coincident--.
    Line 24, "unit" should read --a unit--.

Column 8

Line 14, "a make" should read --make a--.

Column 9

Line 17, "designate" should read --designates--.
    Line 51, "direction 8." should read --direction $\theta$--.

Signed and Sealed this

Fifteenth Day of September, 1998

Attest:

BRUCE LEHMAN

*Attesting Officer*      *Commissioner of Patents and Trademarks*